United States Patent Office 2,827,476
Patented Mar. 18, 1958

2,827,476
PROCESS OF PREPARING ALKENE NITRILES

Johan W. Garritsen, Geleen, and Johannes H. Ottenheym, Sittard, Netherlands, assignors to Stamicarbon N. V.

No Drawing. Application December 28, 1956
Serial No. 631,014

Claims priority, application Netherlands December 30, 1955

7 Claims. (Cl. 260—465.9)

The present invention relates to the preparation of alkene nitriles by dehydration of the corresponding lactams.

It is known that in effecting dehydration reactions, various substances may be used as catalyst. These dehydration catalysts may be divided into three groups:

(a) Catalysts which are acidic in water, such as boron phosphate, clay treated with acid (e. g., bentonite treated with hydrochloric acid), phosphoric acid on a carrier (e. g., on kieselguhr, fuller's earth or silica).

(b) Catalysts which are approximately neutral in water, such as kaolin and activated alumina.

(c) Catalysts which are alkaline in water, such as oxides of alkaline-earth metals, e. g., calcium oxide and barium oxide.

It is an object of the present invention to prepare alkene nitriles by a process which gives increased yields of the alkene nitriles.

Another object of the invention is to prepare alkene nitriles from lactams by a method which considerably reduces by-product formation.

A further object is to prepare hexene nitrile from caprolactam by a novel and more efficient process.

An additional object is to devise an improved method of dehydrating lactams to alkene nitriles using an acidic dehydrating agent.

It has been found that catalysts of the three groups of catalysts referred to supra do not always have the same dehydrating properties and particularly that in the preparation of alkene nitriles from lactams the character of the dehydration reaction products formed varies with change in the class of catalyst used.

It has been found that alkene nitriles are obtained in good yields and the objects of the present invention attained by dehydration of the corresponding lactams in the presence of an excess of ammonia using a dehydration catalyst which gives an acidic reaction in water if the reaction is carried out at 250 to 450° C. and in the vapor phase.

With the process according to the invention, water and ammonia are formed while the resulting alkene nitrile contains as many carbon atoms in the molecule as the original lactam. The double bond is mostly formed between the two carbon atoms at the end of the carbon chain furthest removed from the nitrile group.

The temperature may be varied within the aforementioned range of 250 to 450° C. Below 250° C. dehydration is practically negligible, while at temperatures above 450° C. decomposition and side reactions occur to an undesirable extent. The reaction is preferably carried out at about 350° C. to 400° C.

The dehydration may be effected at atmospheric pressure and there is no appreciable advantage in using higher pressures. Accordingly, the apparatus employed need not be of a kind suitable for working under high pressures. Usually the process is carried out at about 0.5 atmosphere gauge pressure merely to force the vapor through the reaction chamber which is filled with catalyst. However, the vapor can be passed through the reaction chamber by suction, in which case the pressure may be lowered, e. g., to about half atmospheric.

The dehydration catalyst to be used should be acidic in water, for example, acid-treated clay or a phosphate such as boron phosphate or any of the other acid type catalysts as set forth in group (a) above, is preferably used in the form of irregular lumps with a mean diameter of 3 to 6 mm. and introduced into the reaction chamber in a sufficient quantity to permit the process to be carried out by passing the vapor through the mass of catalyst.

The activity of the catalyst can be maintained in a simple manner by intermittently passing air through the catalyst mass instead of lactam and ammonia.

One of the preferred catalysts is boron phosphate.

As previously stated, there should be used an excess of ammonia. Generally, 5 to 15 mols of ammonia are used for every mol of lactam. The use of larger amounts of ammonia does not offer any advantage, although there can be used 50 or even more mols of ammonia per mol of lactams.

The ammonia can be separated from the vapors issuing from the reaction chamber by condensation of the reaction products. After the ammonia has been separated from the liquid reaction product, the ammonia can be reused.

The liquid reaction product is mainly the desired alkene nitrile which can be further purified by distillation.

The ammonia and lactam vapor mixture is generally in contact with the catalyst for 1 to 10 seconds, preferably 4 seconds.

Unless otherwise stated, all parts and percentages are by weight.

Example

A tube 3 cm. in diameter and 60 cm. in length was filled with granular boron phosphate (particle diameter 4 to 6 mm.). ε-Caprolactam vapor and ammonia in the ratio of 11.3 mols of ammonia to 1 mol of lactam were continuously passed through the tube while the temperature in the tube was kept at 390 to 400° C. The space velocity of the lactam vapor-ammonia mixture was 388 liters (measured at 0° C. and 1 atmosphere) per liter of catalyst per hour.

The vapors leaving the reaction tube were condensed by cooling to below 50° C. and separated from the gas. The liquid reaction product was distilled and the organic materials recovered.

In the example, 91.8% of the ε-caprolactam was converted to new products. Upon removal of the reaction water, the converted lactam products were found to consist of 91% 5-hexene nitrile, 8% ω-amino capronitrile and 1% high-boiling residue. This was equivalent to a yield in a single pass of 83.5% of 5-hexene nitrile based on the ε-caprolactam (including unreacted caprolactam) employed.

In place of caprolactam in the example, there can be used other lactams to form the corresponding alkene nitriles, e. g., caprylolactam can be used to form 7-octene nitrile; butyrolactam (2-pyrrolidone) can be used to form 3-butene nitrile; valerolactam can be used to form 4-pentene nitrile and oenantholactam can be used to form 6-heptene nitrile. In fact, there can be used lactams having as many as 10 carbon atoms, such as ω-caprinolactam, to form the corresponding decene nitrile.

We claim:

1. A process of preparing alkene nitriles comprising dehydrating the corresponding lactams in the presence of an excess of ammonia in the vapor phase at a temperature of 250 to 450° C. with the aid of boron phosphate as a dehydration catalyst.

2. A process according to claim 1 wherein the lactam has 4 to 7 carbon atoms.

3. A process according to claim 2 wherein the lactam is ε-caprolactam and the alkene nitrile formed is 5-hexene nitrile.

4. A process according to claim 3 wherein the temperature is between 350 and 400° C. and at least 5 mols of ammonia are used per mol of lactam.

5. A process according to claim 4 wherein 5 to 15 mols of ammonia are used per mol of lactam.

6. A process according to claim 1 wherein at least 5 mols of ammonia are used per mol of lactam.

7. A process for preparing 5-hexene nitrile comprising continuously passing a mixture of ε-caprolactam and ammonia in the ratio of 11.3 mols of ammonia per mol of lactam at a temperature of 390 to 400° C. and a space velocity of 388 liters per liter of catalyst per hour through a zone filled with finely divided boron phosphate as a catalyst, cooling the vapors issuing from the reaction zone to condense a liquid reaction product and recovering 5-hexene nitrile from the liquid reaction product.

References Cited in the file of this patent
UNITED STATES PATENTS

| | | |
|---|---|---|
| 2,234,566 | Lazier et al. | Mar. 11, 1941 |
| 2,404,280 | Dutcher | July 16, 1946 |